(12) United States Patent
Ingrisch et al.

(10) Patent No.: US 7,721,603 B2
(45) Date of Patent: May 25, 2010

(54) INERTIAL SENSOR ARRANGEMENT

(75) Inventors: Kurt Ingrisch, Reutlingen (DE); Erich Ilic, Unterhausen (DE); Manfred Abendroth, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 11/911,915

(22) PCT Filed: Jan. 16, 2007

(86) PCT No.: PCT/EP2007/050373

§ 371 (c)(1),
(2), (4) Date: Oct. 18, 2007

(87) PCT Pub. No.: WO2007/082875

PCT Pub. Date: Jul. 26, 2007

(65) Prior Publication Data

US 2008/0264169 A1   Oct. 30, 2008

(30) Foreign Application Priority Data

Jan. 18, 2006   (DE) .................. 10 2006 002 350

(51) Int. Cl.
*G01P 1/02* (2006.01)

(52) U.S. Cl. .................... 73/494; 73/504.02; 73/514.24

(58) Field of Classification Search ............. 73/504.12,
73/514.14, 514.15, 488, 493, 494, 504.02,
73/504.03, 504.04, 514.01, 514.24, 514.38
See application file for complete search history.

(56) References Cited

U.S. PATENT DOCUMENTS

| 6,199,429 B1 * | 3/2001 | Hirosawa ................. 73/504.15 |
| 6,400,044 B1 * | 6/2002 | Lohberg et al. ............... 307/91 |
| 6,658,937 B2 * | 12/2003 | Ao et al. .................. 73/504.14 |
| 6,927,568 B2 * | 8/2005 | Nozoe et al. ............ 324/207.25 |
| 2002/0158390 A1 * | 10/2002 | Braman et al. ......... 267/140.13 |
| 2006/0000294 A1 * | 1/2006 | Ohta ....................... 73/862.08 |

FOREIGN PATENT DOCUMENTS

| DE | 44 31 232 | 3/1996 |
| DE | 198 11 613 | 9/1999 |
| DE | 199 04 334 | 9/1999 |
| DE | 199 21 692 | 5/2000 |
| DE | 102 31 423 | 2/2003 |

* cited by examiner

*Primary Examiner*—Hezron Williams
*Assistant Examiner*—Samir M Shah
(74) *Attorney, Agent, or Firm*—Michael J. Striker

(57) ABSTRACT

The invention relates to an inertial sensor arrangement (2), in particular for installation in a motor vehicle, having a sensor module (8) which is fitted to a carrier (6) and comprises a micromechanically produced inertial sensor and an evaluation circuit. The invention provides for the sensor module (8) to be connected to the carrier (6) by means of an elastic coupling element (14).

9 Claims, 4 Drawing Sheets

INERTIAL SENSOR ARRANGEMENT

The invention relates to an inertial sensor arrangement as generically defined by the preamble to claim 1, in particular for mounting in a motor vehicle, and to a control unit for a system for regulating the dynamics of vehicle operation in a motor vehicle having such a sensor arrangement.

PRIOR ART

In motor vehicles, both active and passive safety systems are in increasingly wide use; restraint systems, such as airbags, as well as systems for regulating the dynamics of vehicle operation, such as ESP (Electronic Stability Program), are already standard equipment today. One essential component of these systems is inertial sensors, which are used to measure the acceleration or yaw or rotation rate of the vehicle. While the inertial sensors used in such restraint systems as airbags, which sensors may for instance be acceleration sensors for measuring the impact acceleration or rotation rate sensors for rollover sensing, typically form an integral component of a control unit of the restraint system, sensors for measuring the dynamic yaw or rotation rate of a vehicle and the transverse acceleration in systems for regulating the dynamics of vehicle operation, such as ESP, are usually embodied as remote-mounted sensors and accommodated separately from the system control unit, at a suitable point in the fox. However, even in that case, the trend is to integrate the inertial sensor with a built-on control unit.

An economical technical way of producing rotation rate sensors involves micromechanical techniques, in which a measurement element of the sensor is etched out of a substrate, for example. In operation of the sensor, the measurement element is set into an oscillating motion by suitable excitation, the frequency of the motion typically being in the range between 1 and 30 kHz, and the Coriolis acceleration that occurs upon a rotation of the oscillating measurement element is measured and is a standard for the rotation rate. From the measured Coriolis acceleration, an evaluation circuit with a suitable demodulator determines the signal component that is proportional to the rotation rate and from that determines the rotation rate.

However, interfering acceleration is a major problem when such rotation rate sensors are used in motor vehicles; depending on where the sensors are mounted, such acceleration occurs to a greater or lesser extent, and if this acceleration reaches the measurement element of the sensor, it has an especially strong influence on the output signal of the sensor if its frequency is within the range of the triggering frequency of the sensor. Since the demodulator, or the evaluation circuit, in this case can no longer distinguish between Coriolis acceleration and interfering acceleration, the output signal of the sensor is greatly interfered with and is thus no longer acceptable for the system for regulating the dynamics of vehicle operation, and hence the result can be that the system is shut off, or other problems.

To minimize the effect of interfering acceleration, various methods are employed, such as looking for a mounting location where only slight interfering acceleration occurs, vibrational decoupling of the sensor from the mounting location, or combinations of these provisions. However, because it can be difficult and complicated, given the tight space conditions in modern passenger cars and the driving tests required for this, to look for a suitable mounting point, the packing of known micromechanical measurement elements of inertial sensors, despite many kinds of structural forms, is not suited for preventing interfering acceleration from being fed in; therefore the entire structural unit containing the sensor, for example the entire control unit, is occasionally connected to the mounting point via an elastic coupling member.

In addition, for example from German Patent Disclosure DE 44 31 232 A1, in acceleration sensors or rotation rate sensors, it is already known per se for the micromechanically produced measurement element itself to be embodied as an integrated spring-mass system with damping; elastic ribs machined out of the substrate assure the spring and damping action between the measurement element and a base that, like the measurement element, is formed from the substrate.

ADVANTAGES OF THE INVENTION

The inertial sensor arrangement of the invention, having the characteristics of claim 1, makes it possible by comparison, despite the use of commercially available sensor modules comprising the inertial sensor and an integrated evaluation circuit, make it possible to reduce the application cost for use in motor vehicles considerably, since it is no longer necessary to look for a suitable mounting point or to make retroactive provisions for vibration decoupling. With the provisions of the invention, the sensor itself, when the sensor arrangement is installed in an environment subject to major interfering acceleration or interfering vibration, furnishes safe, reliable signals under all circumstances.

The invention is based on the concept of decoupling the sensor module vibrationally from the substrate by suitably defining the mass of the spring-mass system, the spring stiffness of the spring of the spring-mass system, and its damping, in order to reduce the sensitivity in terms of acceleration or vibration of the rotation rate sensor in the arrangement decisively in the critical frequency ranges.

Rotation rate sensors operating on the Coriolis principle react especially sensitively to interfering acceleration in the direction in space in which the vector of the Coriolis acceleration points. For this reason, it is especially important to design the function of the vibrational uncoupling or vibrational decoupling for that direction in space.

A preferred embodiment of the invention provides that for vibrational decoupling of the sensor module from the substrate, an elastomer material is used that assures both the spring action and the damping of the mass of the spring-mass system relative to the substrate. So that elastomers can be used as spring/damping elements, the construction must be designed in such a way that the elastomer is subjected to shear force in the direction in space in which the vibration decoupling is to take place, or in other words the direction in space in which the vector of the Coriolis acceleration points, since only shear loading of elastomers assures appropriate design of vibration uncoupling or vibration decoupling. An advantage of using an elastomer material is that its spring stiffness and thus the resonant frequency of the system can be relatively easily varied by varying the properties and/or dimensions of the material.

With the aid of a spring with damping, formed by the elastomer material, between the sensor module and the substrate, the production of the sensor arrangement can also be simplified by placing the sensor module or a mounting plate for it, together with the substrate, in an injection mold and injecting the elastomer material around the sensor module or mounting plate into a gap located between the sensor module or the mounting plate and the substrate, so as to connect the two components elastically to one another and at the same time decouple them vibrationally.

Preferably, an elastosil is used for this purpose, that is, a dense, pore-free elastomer material based on silicone rubber, such as liquid silicone rubber (LSR), whose spring stiffness after it solidifies has a value that, given the usual masses of a sensor module in a micromechanically produced rotation rate sensor, has a resonant frequency that is far below the critical frequency range and thus has strong damping in the critical frequency range.

A further advantageous feature of the invention provides that the sensor module includes a plate that supports both the inertial sensor and the evaluation circuit and that is inserted into a somewhat larger congruent recess in the substrate and suspended elastically in the substrate by being embedded in the injected elastomer material. When the plate moves perpendicular to its broad side faces, the elastomer material that spans the gap between the plate and the substrate is subjected to shear force. This shear stress on the elastomer material assures excellent damping in the critical frequency range, and this makes it possible to use the inertial sensor arrangement of the invention in regions that are subject to severe vibration.

It is especially advantageous to build the inertial sensor arrangement of the invention directly into a control unit of a system for regulating the dynamics of vehicle operation, such as a built-on control unit of an ESP; as a result, extensive wiring and an additional vibrationally decoupled housing for the sensor arrangement can be dispensed with.

In order for the measurement values of the inertial sensor, converted by the evaluation circuit into electrical signals, to be transmitted to the control unit without interfering with the vibrational decoupling of the sensor module from the substrate that is rigidly built into the control unit, the transmission of the signals is preferentially done through bonding wires, which lead from the evaluation circuit of the sensor module to a circuit on the substrate that is connected to the control unit.

DRAWINGS

The invention will be described in further detail below in terms of an exemplary embodiment, in conjunction with the associated drawings. In the drawings.

Figure 4:
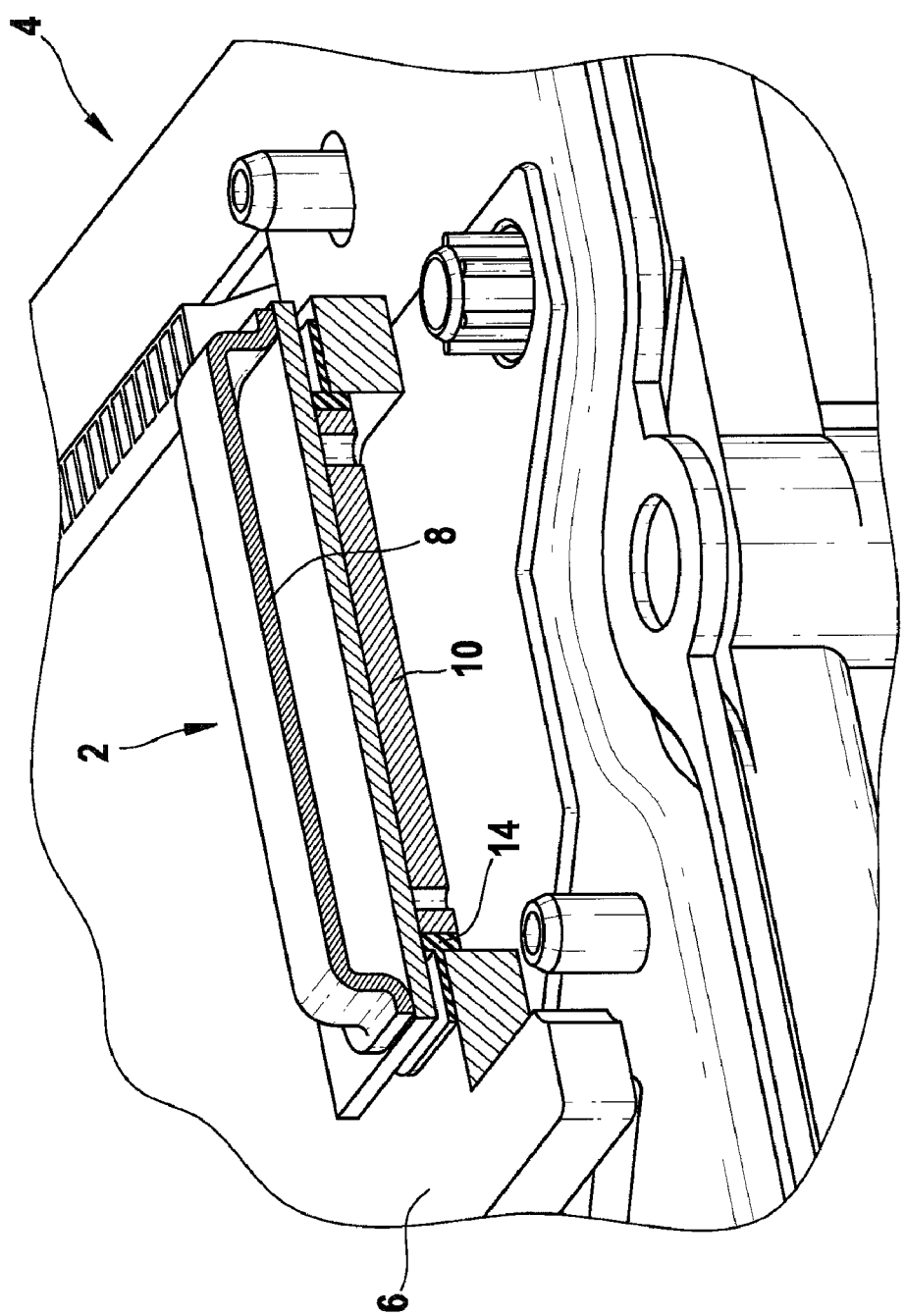
Figure 5:
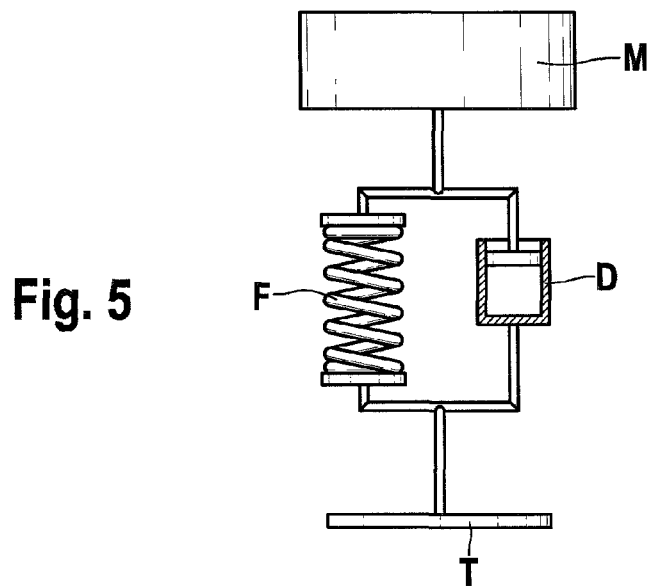
Figure 6:
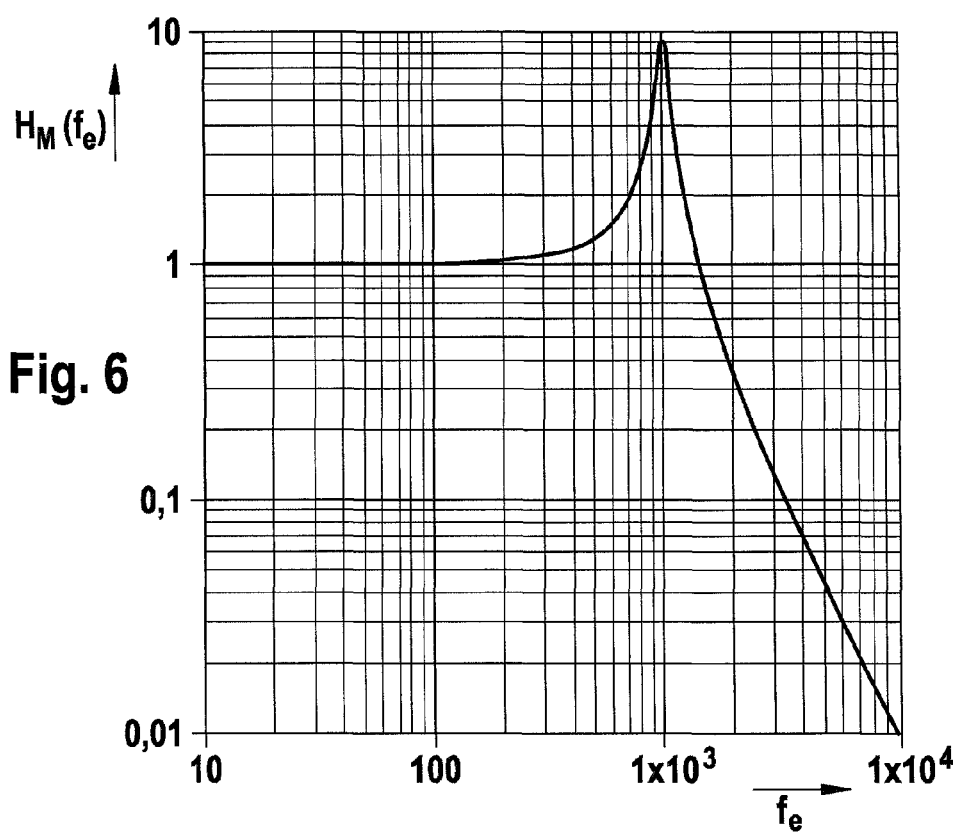

FIG. 4, partly in section, is an enlarged perspective view of part of the control unit and inertial sensor arrangement;

FIG. 5 is a schematic illustration of a spring-mass system;

FIG. 6 is a diagram of the amplitude transmission function of the spring-mass system.

DESCRIPTION OF THE EXEMPLARY EMBODIMENT

Figure 1:
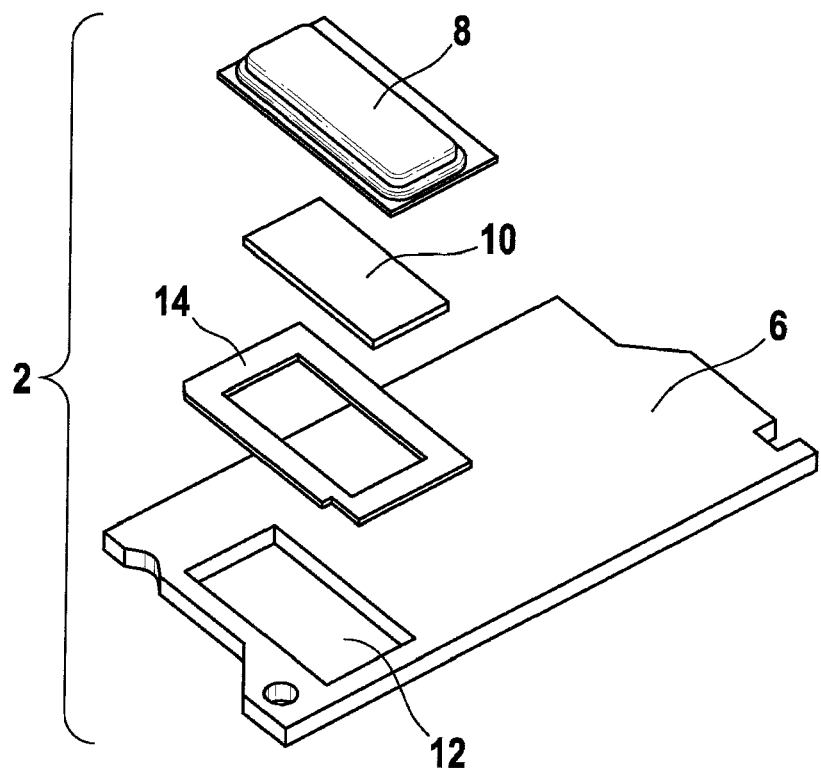
FIG. 1 shows an exploded perspective view of an inertial sensor arrangement of the invention.
Figure 2:
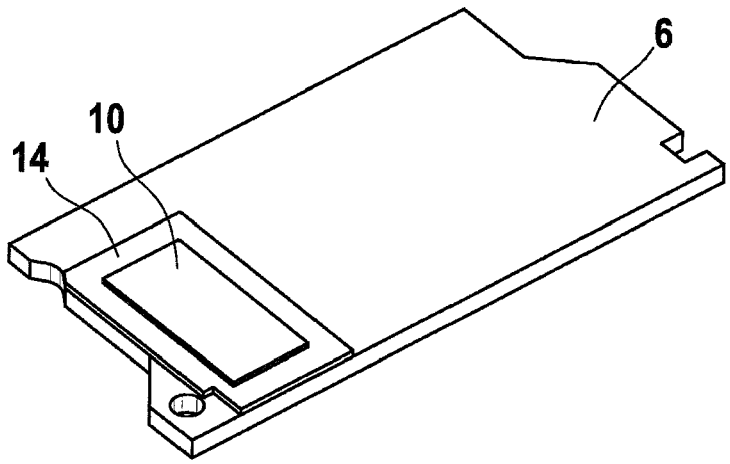
FIG. 2 is a perspective view of parts of the inertial sensor arrangement in FIG. 1.
Figure 3:
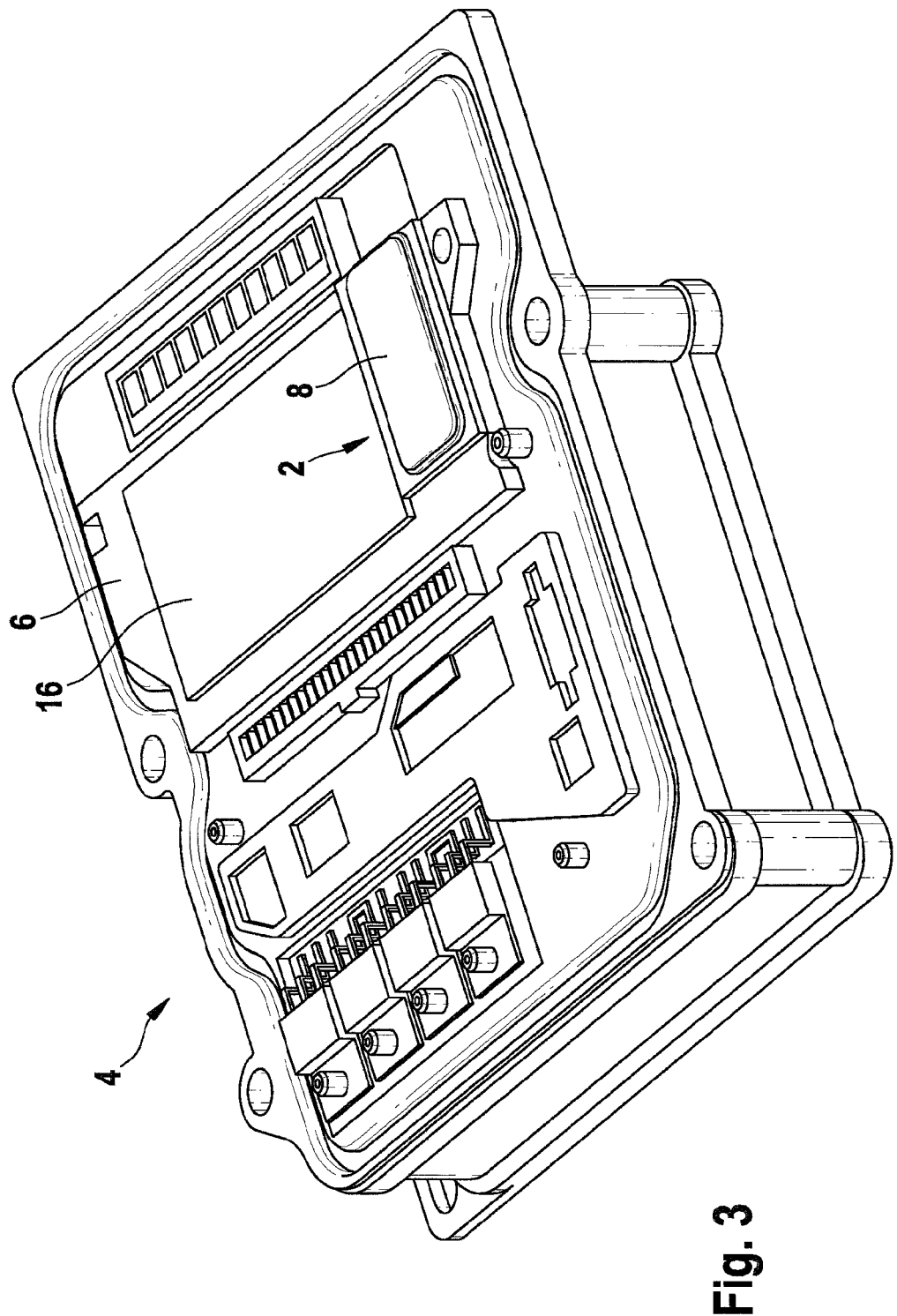
FIG. 3 is a perspective view of a control unit of a system for regulating the dynamics of vehicle operation in a motor vehicle having the built-in inertial sensor arrangement from FIG. 1.

The inertial sensor arrangement 2 shown in FIGS. 1 through 4 forms part of a built-on control unit 4 of a system, best seen in FIG. 3, for regulating the dynamics of vehicle operation and substantially comprises not only a substrate plate 6, for rigid fastening to the built-on control unit 4, but also a sensor module 8, which is mounted on the substrate plate 6 and includes a micromechanically produced rotation rate sensor (not shown) and an evaluation circuit in the form of an ASIC (not shown) mounted on the sensor.

The rotation rate sensor serves to detect a dynamic yaw or rotation rate of a vehicle, and in its interior it has a measurement element which is excited, in a manner known per se, in order to be set into an oscillating motion with a vibration frequency of between 1 and 30 kHz. If the mass, formed by the measurement element, having the speed b is exposed to a superimposed rotary motion with a rotation rate ω, the measurement element is accelerated with the Coriolis acceleration $\vec{a}_c$. Since for the magnitude of the Coriolis acceleration $\vec{a}_c$, the condition $\vec{a}_c = 2(\vec{\omega} \times \vec{v})$ applies, a signal component proportional to the rotation rate, and thus the rotation rate itself, can be ascertained from the measured Coriolis acceleration $a_c$ by a demodulator of the evaluation circuit of the sensor.

The frequency of the Coriolis acceleration $\vec{a}_c$ that occurs corresponds to the excitation or vibration frequency of the oscillating mass, or the vibration of the measurement element; as a result, the sensor is quite vulnerable to interfering acceleration or interfering vibration at a frequency in the range of this excitation or vibration frequency, since the demodulator can no longer distinguish between interfering acceleration and Coriolis acceleration. Therefore, if such interfering acceleration occurs at the installation point of the control unit 4, the result can be that the output signal of the sensor is greatly interfered with and is no longer acceptable for the system for regulating the dynamics of vehicle operation, such as an ESP system, which as a consequence leads to system shutoffs or other unwanted problems.

To prevent the rotation rate sensor from being exposed to such interfering acceleration, the sensor module 8 is mounted on a mounting plate 10 that is previously placed in a mold a somewhat larger congruent recess 22 in the substrate plate 6 and is then embedded by injection molding in an elastomer material 14, as best seen in FIG. 2. The elastomer material 14, comprising liquid silicone rubber (LSR), after solidifying adheres to the diametrically opposed edges of the mounting plate 10 and recess 12 in the substrate plate 6; this material spans a gap extending all the way around between the mounting plate 10 and the substrate plate 6 along its entire length and overlaps the top side of the edge of the recess 12. The substrate plate 6, made from aluminum, supports not only the sensor module 8 but also a hybrid circuit 16 (FIG. 3), which however is not shown in detail.

As a result of this arrangement, once the sensor module 8 has been mounted on the mounting plate 10, a spring-mass system with damping is formed, as schematically shown in FIG. 5, in which system the sensor module 8 and the mounting plate 10 jointly form a seismic mass M, the substrate plate 6 forms a substrate T, and the elastomer material 14 forms the spring F, and simultaneously assures the damping D as a result of its internal friction.

Upon a relative motion of the substrate plate 6 and mounting plate 10 in a direction perpendicular to the broad side faces of the mounting plate 10, the elastomer material 14 is subjected to shear force, and as a consequence of this stress, from its internal friction or the absorption of deformation energy, it assures damping of the motion and hence vibrational decoupling of the mounting plate 10, and hence of the sensor module 8, from the substrate plate 6 in the direction that is decisive for the sensor.

By a suitable choice of the sum of the masses of the sensor module 8 and of the mounting plate 10, as well as a suitable choice of the material properties, the width of the encompassing gap between the mounting plate 10 and the substrate plate 6, and the cross-sectional dimensions of the elastomer material 14 in the gap and hence of its spring stiffness as well, the resonant frequency of the spring-mass system formed by these components can be controlled in such a way that it is far below the critical vibration frequencies.

FIG. 6 shows one example of a spring-mass system that is suitable for decoupling of a rotation rate sensor; it has a vibration frequency of 10 kHz and is therefore especially sensitive to interfering acceleration at such frequencies. The spring-mass system shown in FIG. 6 has a resonant frequency of 1 kHz, and beyond the resonant frequency it has a steeply dropping amplitude transmission function, at which, at ten times the resonant frequency, the transmission amplitude amounts to only 1% of the excitation amplitude.

In the inertial sensor arrangement 2 of the invention, the masses of the sensor module 8 and of the mounting plate 10 are therefore adapted to the spring stiffness of the elastomer material 14 in such a way that the resonant frequency of the spring-mass system is markedly below the critical frequency range at which the rotation rate sensor is to be decoupled or uncoupled from the substrate plate 2, or in other words in the present case 10 kHz. The resonant frequency of the spring-mass system is therefore suitably shifted to a range of approximately 1 kHz, so that interfering acceleration in the range of 10 kHz now reaches the sensor with only 1% of its amplitude.

Once the substrate plate 6 has been built into the control unit 4, as shown in FIG. 3, the evaluation circuit, with associated terminals of the control unit 4, is connected to the hybrid circuit 16 by bonding wires (not shown), so as to forward the signals from the evaluation circuit of the sensor module 8 to the circuit 16 and from it to the control unit 4. After that, the control unit 4 can be mounted on a body part of the motor vehicle; because of the damping by the elastomer material 14, in the range above 10 kHz even major vibration is not transmitted into the sensor module 8.

The invention claimed is:

1. An inertial sensor arrangement for mounting in a motor vehicle, having a sensor module which is mounted on a substrate and which includes a micromechanically produced inertial sensor and an evaluation circuit, in which the sensor module (8) is connected to the substrate (6) by an elastic coupling element (14), and, together with the substrate (6) and the coupling element (14), forms a spring-mass system with damping, wherein a resonant frequency of the spring-mass system is lower than a frequency of an acceleration to be measured at least by a factor of 10, and wherein the coupling element comprises an elastomer material (14), and, in order to decouple vibrations due to interfering accelerations on the inertial sensor, is configured so that it is subjected to shearing force in the direction in space of a vector of the acceleration to be measured using the inertial sensor.

2. The inertial sensor arrangement as defined by claim 1, characterized in that the elastomer material (14) is an elastosil.

3. The inertial sensor arrangement as defined by claim 1, characterized in that the elastomer material (14) is injected between the substrate (6) and a mounting plate (10) for the sensor module (8).

4. The inertial sensor arrangement as defined by claim 3, characterized in that the substrate (6) has a recess (12); that the mounting plate (10) is located in the recess (12); and that the substrate (6) and the mounting plate (10) are joined, along at least a portion of their diametrically opposed edges, by the elastomer material (14).

5. The inertial sensor arrangement as defined by claim 1, characterized in that the sensor module (8) is connected by means of bond wires to a circuit (16) located on the substrate (6).

6. The inertial sensor arrangement as defined by claim 1, characterized in that the inertial sensor is a rotation rate sensor, which detects the Coriolis acceleration of an oscillating sensor element; and that the coupling element, comprising an elastomer material (14), is subjected to a shearing force in the direction of the vector of the Coriolis acceleration.

7. A built-on control unit for a system for regulating the dynamics of vehicle operation of a motor vehicle, characterized by a built-in inertial sensor arrangement as defined by claim 1.

8. A motor vehicle, characterized by a built-on control unit as defined by claim 7.

9. The inertial sensor arrangement as defined by claim 1, characterized that the shear stress of the elastomer material (14) occurs perpendicularly to the broad side faces of the mounting plate (10).

* * * * *